(12) United States Patent
Wu et al.

(10) Patent No.: US 7,909,966 B2
(45) Date of Patent: Mar. 22, 2011

(54) APPARATUS FOR CATALYTIC DISTILLATION PROCESSES

(75) Inventors: Kuang-Yeu Wu, Plano, TX (US);
Pai-Yu Polly Chiang, Plano, TX (US);
Tzong-Bin Lin, Chiayi (TW);
Hung-Chung Shen, Chiayi (TW); Karl T. Chuang, Edmonton (CA)

(73) Assignees: AMT International, Inc., Plano, TX (US); CPC Corporation, Taiwan (TW)

( * ) Notice: Subject to any disclaimer, the term of this patent is extended or adjusted under 35 U.S.C. 154(b) by 1340 days.

(21) Appl. No.: 11/266,124

(22) Filed: Nov. 2, 2005

(65) Prior Publication Data

US 2007/0095646 A1    May 3, 2007

(51) Int. Cl.
*B01D 3/20* (2006.01)
*B01D 3/22* (2006.01)
*B01J 8/04* (2006.01)

(52) U.S. Cl. .............. 202/158; 202/160; 261/114.2; 261/114.4; 261/114.5; 261/DIG. 72; 422/190; 422/192; 422/211; 422/215

(58) Field of Classification Search .............. 202/158, 202/160; 203/2, 29, 41, DIG. 6; 261/114.2, 261/114.4, 114.5, DIG. 72; 422/190, 192, 211, 215

See application file for complete search history.

(56) References Cited

U.S. PATENT DOCUMENTS

| 5,262,094 | A | * | 11/1993 | Chuang et al. | ............. 261/97 |
| 5,567,396 | A | * | 10/1996 | Perry et al. | ............. 422/190 |
| 5,762,668 | A | * | 6/1998 | Lee et al. | ............. 55/486 |
| 5,779,993 | A | * | 7/1998 | Gentry | ............. 422/191 |
| 6,723,886 | B2 | * | 4/2004 | Allison et al. | ............. 568/909 |
| 7,172,179 | B2 | * | 2/2007 | Jacobs et al. | ............. 261/97 |
| 2004/0104108 | A1 | * | 6/2004 | Mason et al. | ............. 203/100 |

* cited by examiner

*Primary Examiner* — Virginia Manoharan
(74) *Attorney, Agent, or Firm* — Spencer S. Chen (57) ABSTRACT

The invention disclosed relates to catalytic distillation column internals providing improved liquid reaction mixture and catalyst contacting for simultaneous catalytic reaction and separation of the reaction mixture. The invention is an improved catalytic distillation apparatus providing optimum balance of catalytic reaction and mass transfer steps, wherein distribution, mixing and feeding of liquid reaction mixture to the reaction zone and distillation section are better controlled and more uniformly applied. At least one catalyst bed is situated in at least one receiving pan of a distillation tray so that the tray performs the functions of both of the reaction section and the distillation section of the catalytic distillation column simultaneously within a stage.

8 Claims, 11 Drawing Sheets

APPARATUS FOR CATALYTIC DISTILLATION PROCESSES

BACKGROUND OF THE INVENTION

The invention relates generally to an apparatus for use in catalytic distillation processes, and more particularly to column internals for catalytic distillation processes. The present invention is particularly suited for column internals utilizing catalyst beds and trays with multiple stage sections.

Catalytic distillation processes are processes in which at least one chemical reaction is carried out in the presence of at least one solid catalyst. The chemical reaction occurs simultaneously with distillation of a reaction mixture obtained within one vessel. Several types of apparatus have been described for use in a variety of catalytic distillation processes.

The key part of developing catalytic distillation technology is the design of internal elements or tower internals for the catalytic distillation columns. The functions of column internals are to carry out both the catalytic reaction and mass transfer simultaneously. In the past fifteen years, numerous patents have been awarded for the design of the new internals. They can be classified as follows:

1. Cloth Belt (U.S. Pat. No. 4,215,011). The catalyst is sealed within a cloth belt. The belt is then wrapped in an open mesh knitted non-reactive wire. Liquid can penetrate into and flow out from the catalyst through the cloth. The liquid wetted surface of the cloth belt provides the vapor-liquid interfacial area for mass transfer.

The mass transfer efficiency for this type of catalyst unit is very low because of the low interfacial area. The effectiveness of the catalyst inside the belt may change from location to location because of the different liquid residence time within the cloth. This reduces the overall system efficiency.

2. Catalyst Container Held on a Tray (U.S. Pat. Nos. 4,536,373, 4,439,350, 5,447,609, 5,449,501, 5,776,320, 5,792,428, 5,888,355 and 6,045,762). One type of this catalytic distillation unit consists of a normal distillation tray and a parallel array of rectangular tubes (troughs) filled with a catalyst. The tubes (troughs) are constructed with metal screen and closed at both ends. The parallel tubes (troughs) may be supported above a distillation tray and should be located within a froth zone when the column is in operation. The liquid reaction mixture flows across the tray either parallel to or at right angles to the tubes (troughs).

Another type of this unit consists of a conventional distillation tray and closed porous containers containing catalyst. The containers are installed above or on the distillation tray in the tower. At least one tray may be combined with a packed catalyst bed. Another type of unit includes catalyst containing reaction zones in the downcomer in which liquid reaction mixture rises through a catalyst bed before exiting downward from an opening at the top of the reaction zone.

The structure of these units is usually quite complex, thus leading to a greater cost in the overall system. The catalyst quantity that can be loaded is also limited by both volume and spacing. It is not suitable if the catalytic reaction step is slow because the reaction rate may not be matched with the mass transfer rate and will lower the overall efficiency of the system.

3. Packings Random packings (U.S. Pat. Nos. 4,443,559, 5,057,468, 5,275,790, 5,262,012, and 5,189,001), e.g. Raschig rings, can be made of a polymer catalyst such as ion exchange resins. The random packing in the column acts as both a catalyst and an aid to mass transfer. The random packing can also be made from rigid containers having a volume substantially smaller than the volume of a reactive distillation column.

The catalyst can be loaded into the container. Openings in the containers are provided to allow vapor and liquid passage into and out of the containers. The surfaces of the containers provide the necessary facets for improving vapor-liquid contact for the distillation. The rigidity of the containers provides for the spacing of the structures and the necessary free space for the distillation.

Another type of this unit consists of a catalyst component and a resilient component intimately associated therewith. The resilient component has at least about 70% volume open space and is present with the catalyst component in an amount such that the catalyst distillation structure consists of at least 10% volume open space.

Structured Packings (U.S. Pat. Nos. 5,073,236, 5,235,102, and 5,348,710) are constructed using corrugated screen envelopes with catalyst filled inside. Each envelope consists of two layers of crimped screen, roughly 30 centimeters (1 ft.) square, which are sealed at the edges. The envelopes are stacked and bound to make "bricks", which in turn are stacked to fill the column. The packing can also be fabricated in rigid, cellular monoliths or in a rigid, cellular monolith coated with a catalytically active material.

Liquid reaction mixture holdup or the time the liquid reaction mixture is retained within this type of column internals is low. Therefore, it is not suitable for a slow reaction. Like cloth belts, the effectiveness of the catalyst at the surface may be different from that catalyst at the inside because of the different liquid residence time within the packing. Additionally, the complex nature of the screens and packing leads to an increased cost of the internals and system.

4. Tray Plus Fixed Bed of Catalyst (U.S. Pat. Nos. 5,130,102, 5,368,691, 5,013,407, 5,026,459 and 6,441,252). In these catalytic distillation units, the reactive zone consists of alternate beds of catalyst and catalyst-free distillation zones. Passageways may be provided for a vapor in the fixed bed. Distillation zones contain conventional distillation trays and liquid distribution plates.

The structures of these units typically are complex and relatively high in cost. The liquid flow pattern may be far from plug flow or single direction flow. Therefore, their efficiency could be low.

5. Conventional Distillation Tray with Catalyst Placed in the Downcomer (U.S. Pat. Nos. 3,579,309, 5,277,847, 3,629,478, and 3,634,535). In these units, downcomers attached to conventional trays are filled with catalyst, which serve as a reaction zone, and the trays act as a distillation zone.

In these units, a portion of the catalyst may not be exposed to liquid reaction mixture, thus reducing its activity. Also, loading is limited by the downcomer size. It is not suitable for slow reaction processes. The catalyst bed may pose a restriction to the liquid reaction mixture flow in the downcomer which in turn may cause a backup of liquid reaction mixture onto the tray, thereby reducing distillation efficiency.

6. Fixed Catalyst Bed with a Distribution Element (U.S. Pat. No. 5,523,062). In this arrangement, a corrugated plate having openings only at the peaks or valleys of the corrugation is used as a distribution element for the fixed catalyst bed. The plate and fixed bed are installed alternatively. The plate makes little or no contribution to mass transfer.

The liquid reaction mixture distribution to the lower catalyst bed can deteriorate if the plate is not properly installed. Radial mixing of liquid reaction mixture in the column is minimal. All of these beds may cause great uncertainty in the operation of such a catalytic distillation unit. For the catalyst part, the same disadvantages exist as described for packings, shown above in (3). Steps in a complex process may be conducted as discreet catalytic distillation processes in a sequence of units (U.S. Pat. Nos. 6,294,684, 6,407,300 and 6,767,517).

It will be apparent that each of the different types of units has its advantages and disadvantages. However, none the above-described systems provides structures that may easily be adapted to couple a specific reaction with a desired distillation, i.e. for any given catalytic reaction there is a corresponding distillation rate. There is a need for both improved distribution of the liquid reaction mixture and improved contact of said liquid reaction mixture with the catalyst during catalytic distillation.

BRIEF SUMMARY OF THE INVENTION

The invention provides an apparatus consisting of a vessel that is a column for catalytic distillation processes having at least one support deck in at least one section of the vessel, each said at least one support deck having at least one tray, each at least one tray having at least one distillation section, for distillation of components of a reaction mixture, the reaction mixture comprising a vapor and a liquid reaction mixture; at least one mixing section, for mixing said liquid reaction mixture; and at least one reaction section. At least one catalyst bed is situated within receiving pans of one or more trays so that said trays perform the functions of both of the reaction section and distillation section of the catalytic distillation column. The receiving pans containing catalyst are situated below liquid mixing decks, and the combination of receiving pans and mixing decks are situated beside at least one vapor channel. Liquid reaction mixture alone flows from the liquid mixing decks through at least one vertical liquids downpipe into the receiving pans. The liquids downpipe preferably extends to a depth within the catalyst bed, so that liquid reaction mixture enters the catalyst chamber at a lower part of the catalyst bed, then rises within the catalyst bed to the open space above said catalyst bed. Liquid reaction mixture passes through the catalyst bed, then exits the receiving pan and is distributed into a vapor channel, below the height of the corresponding mixing deck. The combination of these features provides improved distribution of the liquid reaction mixture and improved contact of said liquid reaction mixture with the catalyst during the catalytic distillation process, thus improving the performance of the apparatus.

In embodiments of the present invention, a catalytic distillation apparatus is disclosed comprising a vessel, at least one support deck having a tray in at least a portion of the vessel; the tray having a distillation section, a mixing section, and a reaction section, for simultaneous catalytic reaction and distillation. The catalytic distillation apparatus further comprises the distillation section being a sieve tray. In other embodiments of the invention, the distillation section may be a valve tray, bubble cap tray, or packing.

The catalytic distillation apparatus includes a mixing surface having at least one liquids downpipe through which a liquid reaction mixture descends from the mixing surface of the mixing section into the reaction section to an at least one receiving pan below the mixing surface. The receiving pan has a catalyst for a catalytic reaction. Within the receiving pan, a distributor may be installed for uniform distribution of liquid reaction mixture within the reaction section. The reaction section further includes a pressure equalizer to balance pressure between the reaction section and the distillation section.

The reaction section may also be designed to have a directional flow seal to balance pressure and distribute liquid reaction mixture fed from the tray such that movement of vapor in a countercurrent direction to that of said liquid reaction mixture through the reaction section is prevented. The directional flow seal functions to balance pressure and distribute liquid reaction mixture from the tray.

The distillation section has at least one vapor riser extending through the mixing deck, the vapor riser extending above the mixing deck so that liquid reaction mixture does not flow downward through said vapor riser. The vapor riser also functions to balance the pressure between the reaction and distillation sections.

The catalyst chamber further includes at least one liquid reaction mixture outlet through the sidewall of the catalyst chamber, situated above the catalyst bed, said liquid reaction mixture outlet being in communication with the open portion of the catalyst chamber. Liquid reaction mixture that has risen through the catalyst bed exits from the reaction section through the reaction product outlet to the distillation section.

These, and other, embodiments of the invention will be better appreciated and understood when considered in conjunction with the following description and the accompanying drawings. It should be understood, however, that the following description, while indicating multiple embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

These and the other features of the invention will become more apparent from the following description in which reference is made to the appended drawings, wherein.

DESCRIPTION OF SPECIFIC EMBODIMENTS

For a detailed description of the preferred embodiments, the reader is referred to the attached figures wherein like components are given like numbers for ease of reference.

The present invention arose from the observation that there was pressure drop within a catalytic reaction section of a distillation column. Pressure drop resistance is present when liquid passes through a catalyst bed. By balancing the reaction chamber with the tray above, the pressure drop effect is reduced or minimized. There is extra pressure then available, thus increasing tray capacity and efficiency and increasing the overall efficiency of the column resulting in cost and energy savings.

Additionally, there was an observation that catalytic reaction stages were less efficient due to bypass in the catalyst bed. By directing liquid reaction mixture to the catalyst bed and having a more even distribution of said liquid reaction mixture throughout the catalyst, the catalytic reaction section of the column will be more efficient and have a greater capacity by enhancing capability for catalytic reactions.

Figure 1:
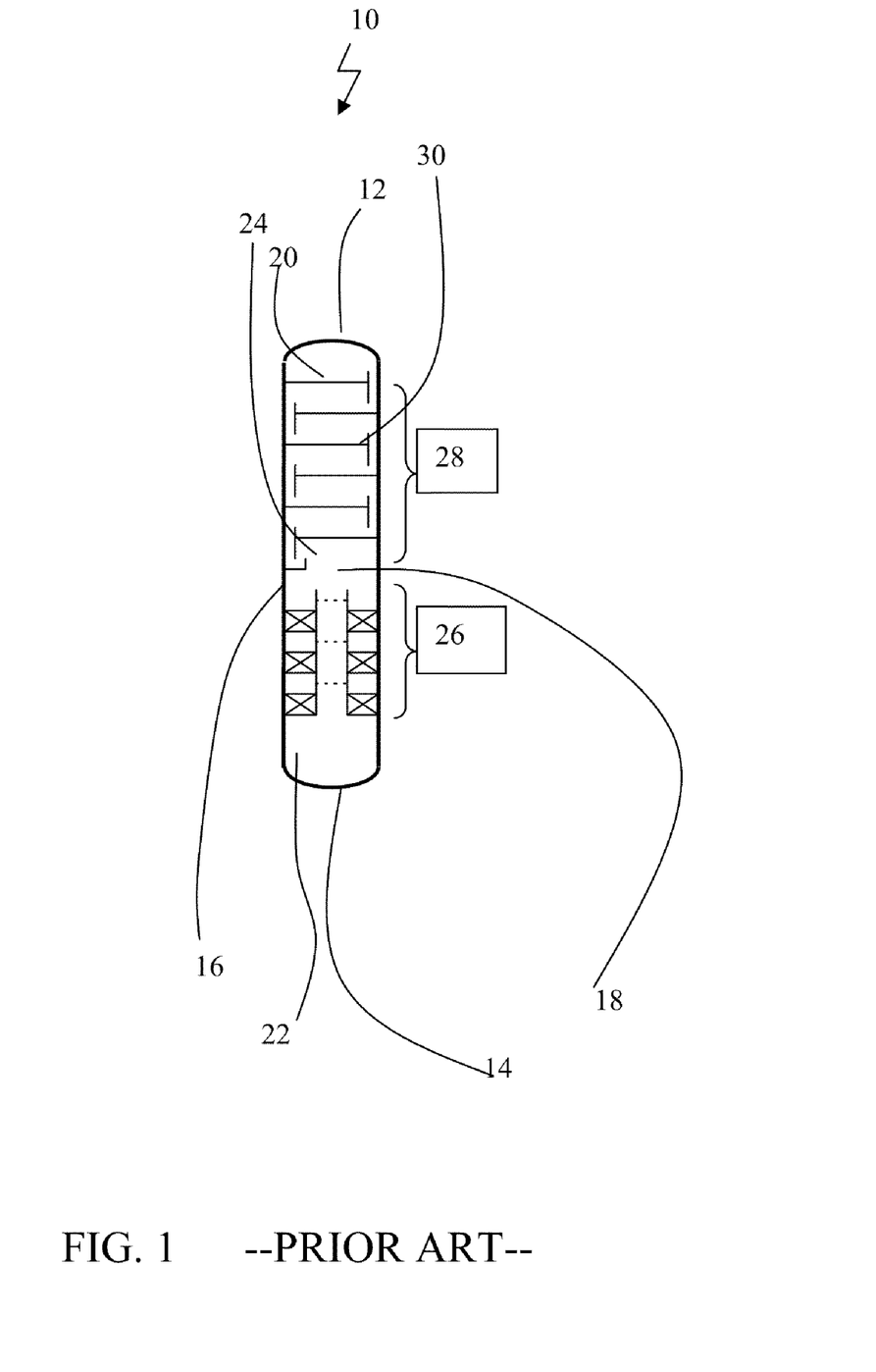
FIG. 1, labeled PRIOR ART, is a schematic diagram of a conventional catalytic distillation column.

FIG. 1, labeled PRIOR ART, is a schematic diagram showing a design for a catalytic distillation column 10 that will be familiar to those skilled in the art. Catalytic distillation column 10 has a top 12, a bottom 14 and sidewalls 16 that enclose an inner compartment 18. Inner compartment 18 has an upper portion 20, a lower portion 22 and a central portion 24. Within inner compartment 18 there are at least one reaction section 26 and at least one distillation section 28 for separating the components of the reaction mixture by distillation. When there is one reaction section 26 within inner compartment 18, said reaction section 26 may be located in lower portion 22 as shown in FIG. 1, or in upper portion 20 or in central portion 24, depending on the process for which catalytic distillation column 10 is used. When there is more than one reaction section 26 within inner compartment 18, said reaction sections 26 may be spaced apart. Distillation section 28 shown in FIG. 1 contains trays 30 for enhancing contact between vapor and liquid phase components of the reaction mixture. It will be recognized that trays 30 in distillation section 28 may be replaced by packing (not illustrated) that may be a random or a structured packing. It also will be recognized that in column 10 the functions of reaction section 26 and distillation 28 occur at separate locations, not at the same tray 30.

Figure 2:
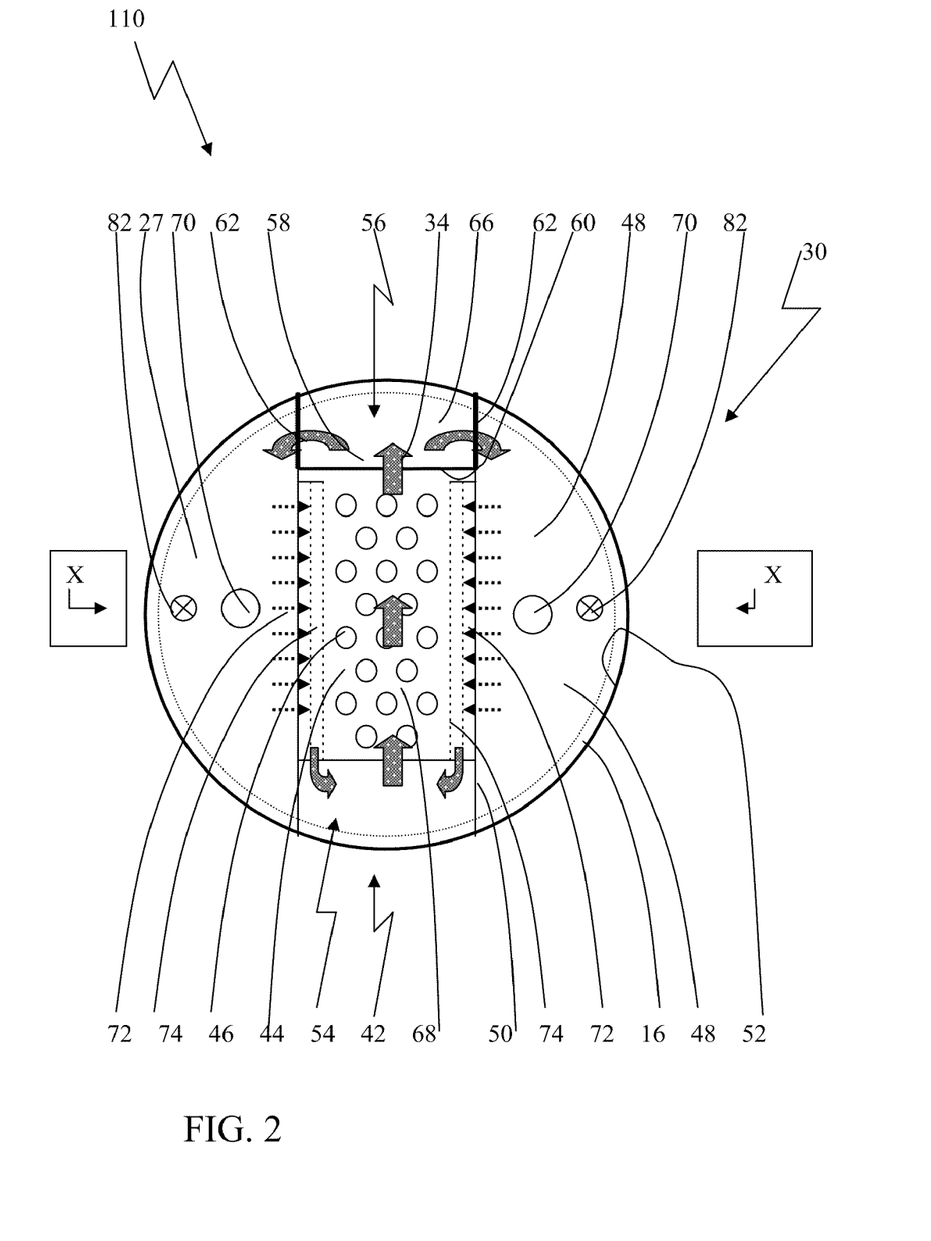
FIG. 2 is a top view of a tray in one embodiment of a catalytic distillation apparatus according to the present invention, with positive seal.
Figure 3:
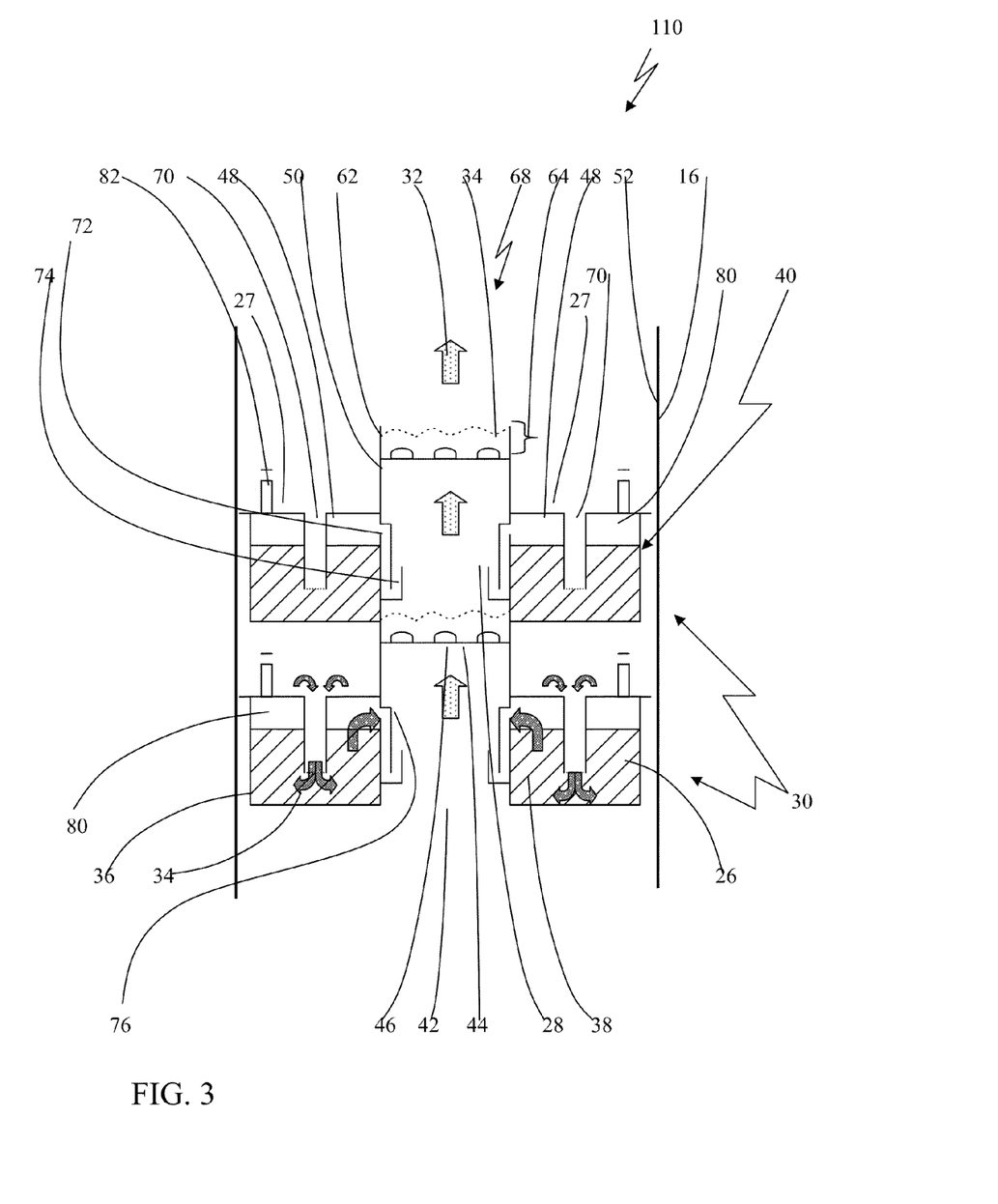
FIG. 3 is a side view of a section, labeled X-X in FIG. 2, of a tray in an embodiment of the catalytic distillation apparatus.
Figure 4:
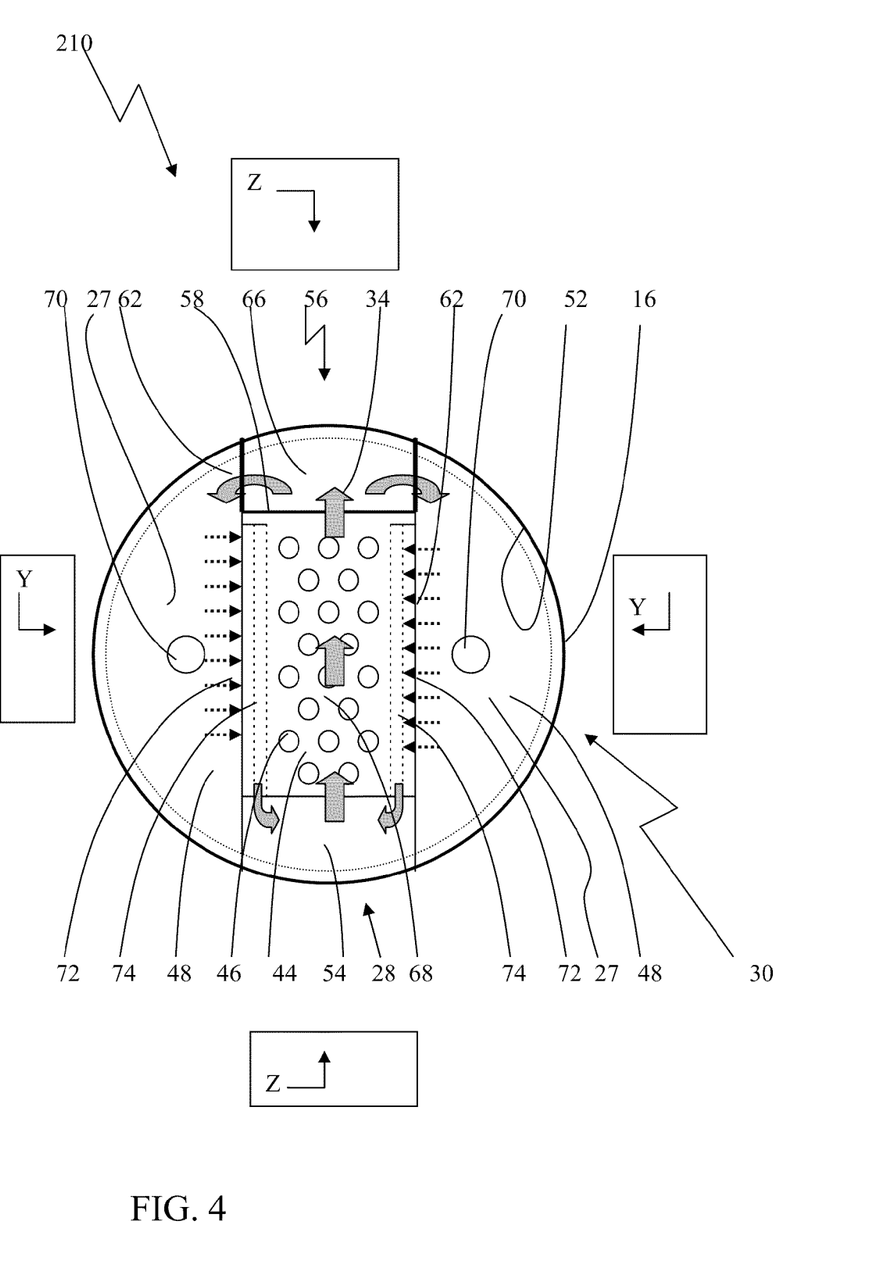
FIG. 4 is a top view of a tray in an alternate embodiment of a catalytic distillation apparatus according to the present invention, without positive seal.
Figure 5:
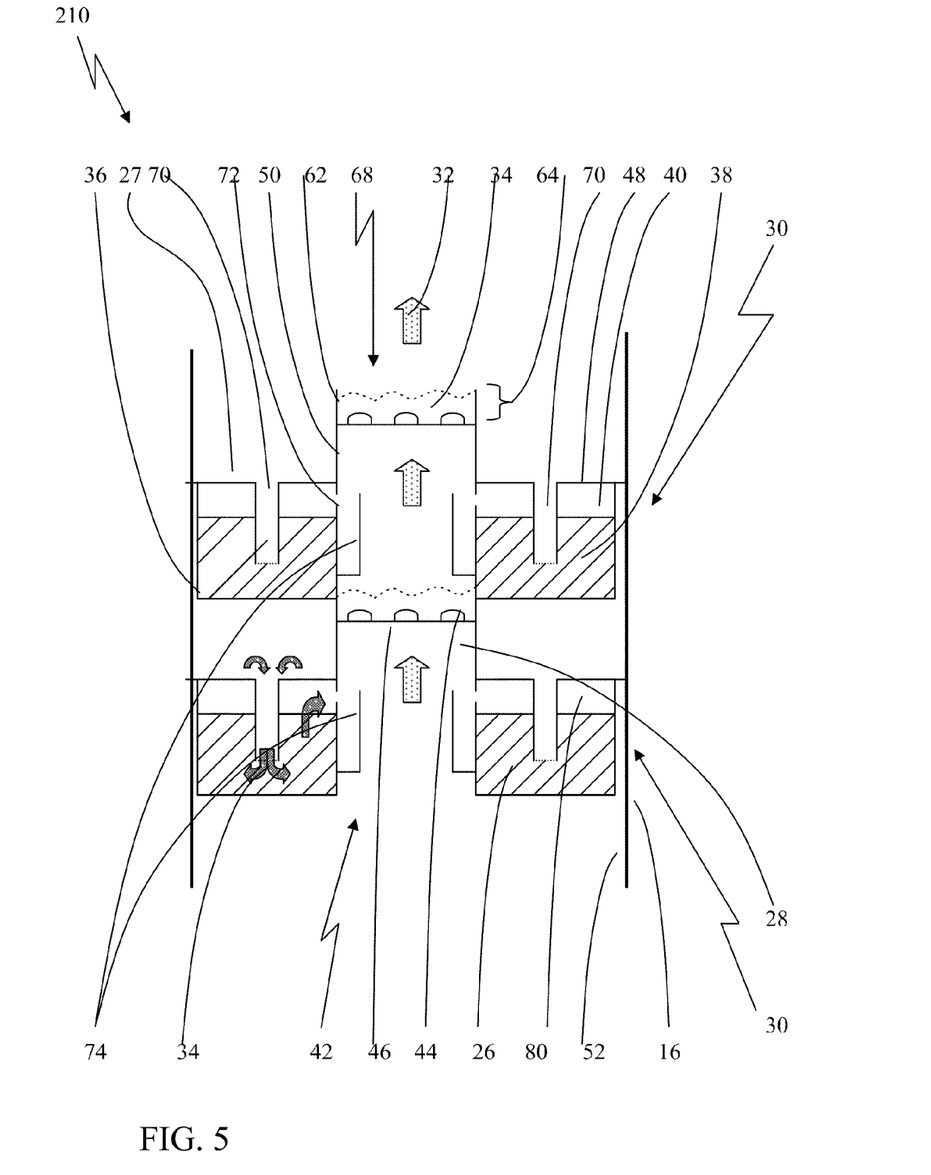
FIG. 5 is a side view of a section, labeled Y-Y in FIG. 4, of an alternate embodiment of the catalytic distillation apparatus.
Figure 6:
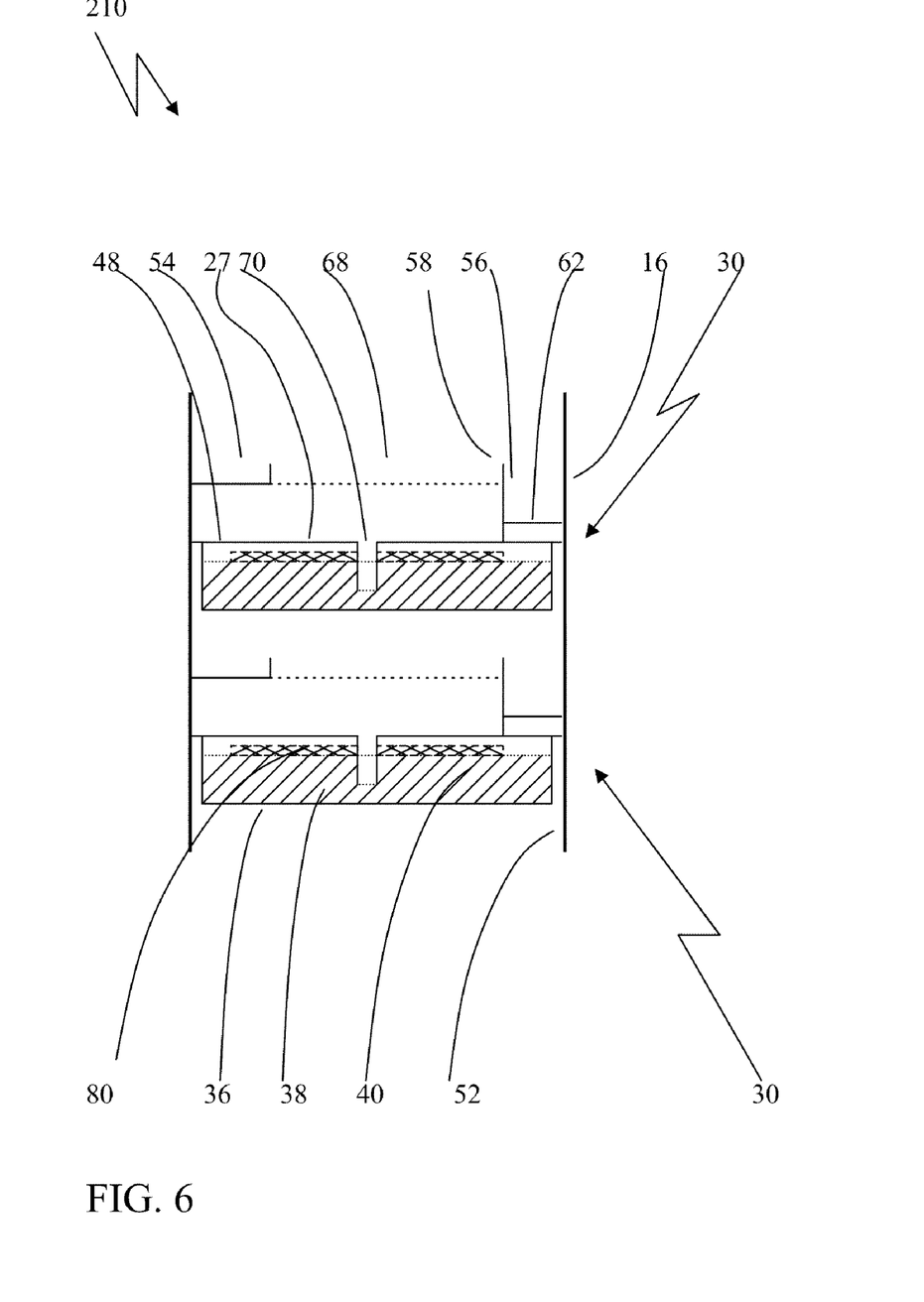
FIG. 6 is a side view of a section, labeled Z-Z in FIG. 4, of an alternate embodiment of the catalytic distillation apparatus.
Figure 7:
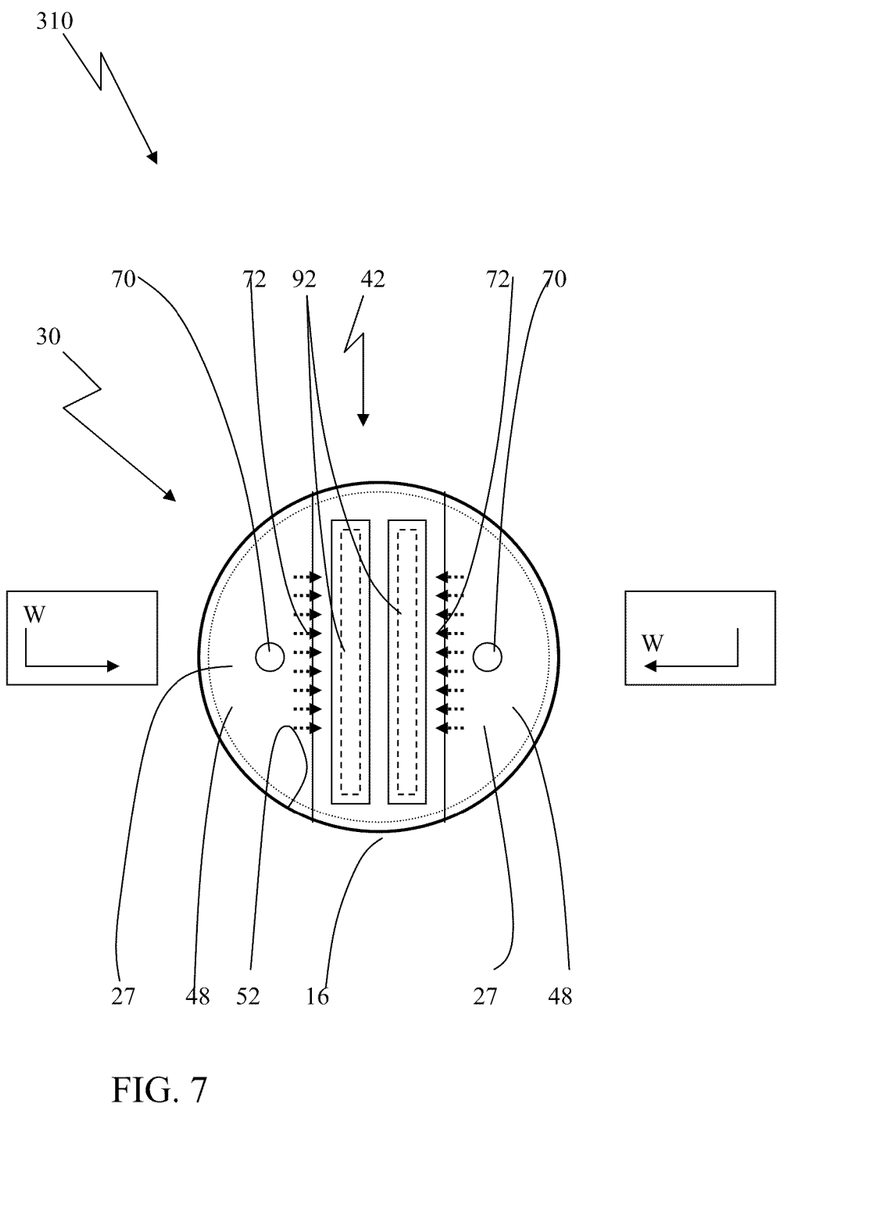
FIG. 7 is a top view of a tray in another embodiment of a catalytic distillation apparatus according to the present invention, in which the tray has a packed catalyst bed and a distillation section with packing.
Figure 8:
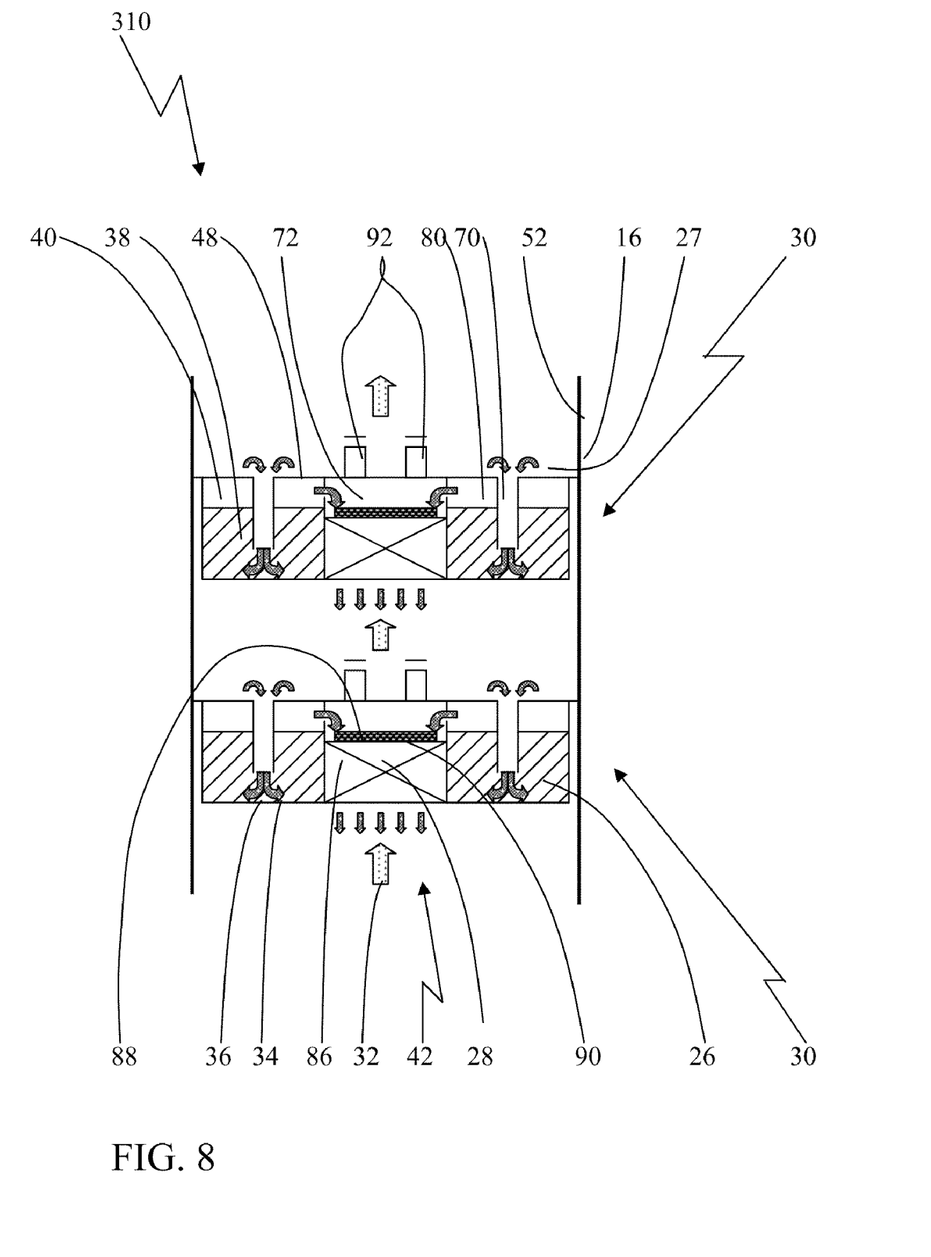
FIG. 8 is a side view of a section, labeled W-W in FIG. 7, of a tray in another embodiment of the catalytic distillation apparatus.
Figure 9:
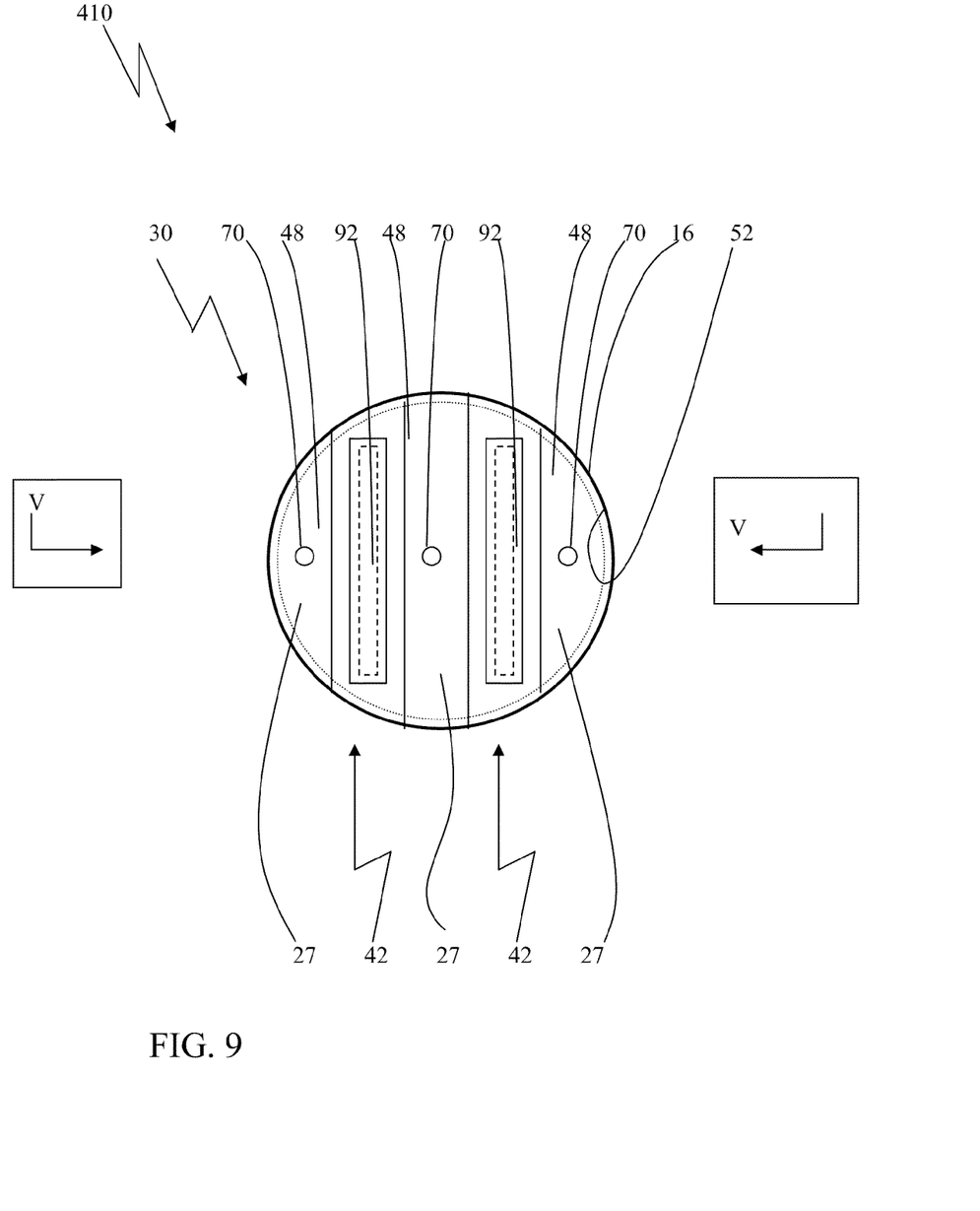
FIG. 9 is a top view of a tray in another embodiment of a catalytic distillation apparatus according to the present invention, in which the tray has multiple packed catalyst beds and distillation sections with packing.
Figure 10:
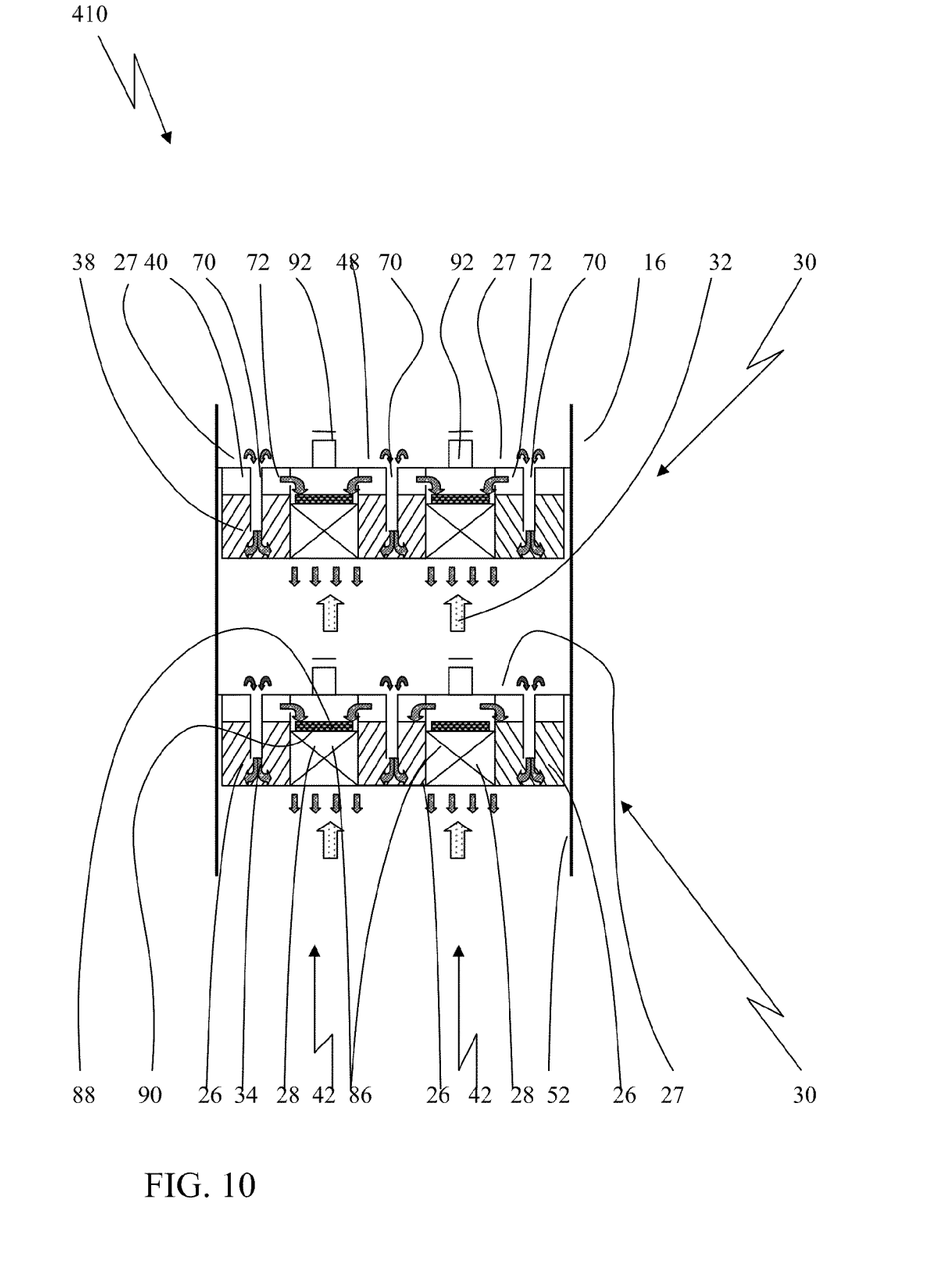
FIG. 10 is a side view of a section, labeled V-V in FIG. 9, of a tray in another embodiment of the catalytic distillation apparatus.

Representative embodiments of an improved catalytic distillation apparatus according to the present invention now will be described with reference to FIGS. 2 through 11. A portion of one embodiment of catalytic distillation column 110 is shown in FIGS. 2 and 3, a portion of another embodiment of catalytic distillation column 210 is shown in FIGS. 4 through 6, a portion of an alternate embodiment of catalytic distillation column 310 is shown in FIGS. 7 and 8 and a section of yet another embodiment of catalytic distillation column 410 is shown in FIGS. 9 and 10.

Catalytic distillation columns 110, 210, 310 and 410 share several features, and also share some features with a representative typical catalytic distillation column 10. The similar features that will be described for catalytic distillation column 110 will have the same reference numerals for descriptions of catalytic distillation column 210, catalytic distillation column 310 and catalytic distillation column 410.

In each of FIGS. 2 through 10, a lightly shaded broad arrow generally indicates the direction of flow of vapor 32. A darkly shaded broad arrow generally indicates the direction of flow of liquid reaction mixture 34.

Whereas a typical catalytic distillation column 10 as illustrated in FIG. 1 has the reaction section 26 and the distillation section 28 in sequence and in distinctly separate sections of the column, each of the representative embodiments of catalytic distillation columns 110, 210, 310, 410 of the present invention combines reaction section 26, mixing section 27 for full mixing of liquid reaction mixture 34 before the reaction mixture is fed to the reaction section, and distillation section 28 for separating components of the reaction mixture, within at least one tray 30. In catalytic distillation columns 110, 210, 310, 410, at least one catalyst bed 38 is situated in at least one catalyst chamber 40 within a receiving pan 36 of distillation tray 30.

The present invention provides for an improved liquid reaction mixture 34 and catalyst 38 contacting system for simultaneous catalytic reaction and distillation of the reaction mixture in the embodiments of catalytic distillation columns 110, 210, 310, 410. The present invention provides a system wherein distribution and application of liquid reaction mixture 34 to reaction section 26 and distillation section 28 is better controlled and more uniformly applied, thereby providing an improved capacity and more efficient catalytic distillation system, with consequently better coordination of the distillation step with the catalytic reaction step.

Turning now to FIG. 2, a top view of a tray 30 within catalytic distillation column 110 according to the present invention is illustrated. Tray 30 is located within a vessel and has a distillation section 28 near or at a portion above the midline of the tray, a mixing section 27 near or at the midline of the tray and a reaction section 26 near or at a portion below the midline of the tray.

Distillation section 28 includes at least one vapor channel 42. Vapor channel 42 extends horizontally across a width of catalytic distillation column 110, as illustrated in FIGS. 2, 4, 7 and 9. Vertical sidewalls 50 extend along each side for the full length of vapor channel 42. A series of horizontal plates 44 each having holes 46 extends across the width between sidewalls 50 of vapor channel 42. Sidewalls 50 have a height selected so as to maintain a depth of liquid reaction mixture 34 in a bubbling area 68 above plate 44.

Vapor channel 42 with plates 44 serves a similar function as distillation section 28 shown in a typical catalytic distillation column 110 illustrated in FIG. 1. However, whereas typical catalytic distillation columns 10 have the reaction section 26 and the distillation section 28 in sequence, the catalytic distillation column of the present invention combines reaction section 26, mixing section 27 and distillation section 28 within tray 30.

Inlet area 54 and a downcomer 56 are at opposed ends plate 44. Inlet area 54 is adjacent to a portion of sidewalls 16 of catalytic distillation column 110 providing an inlet for the distillation section 28. Downcomer 56 is adjacent to a portion of sidewalls 16 diametrically opposite to inlet area 54 providing an output from the distillation section 28. A tray outlet weir 58 extends across an end 60 of plate 44. A downcomer outlet weir 62 extends between each end of tray outlet weir 58 and sidewalls 16 thus surrounding opening 66 of downcomer 56. A combination of tray outlet weir 58 and downcomer outlet weirs 62 also has a pre-designed height to help maintain a depth of liquid reaction mixture 34 in a bubbling area 68 above plate 44.

In mixing section 27, tray 30 has a liquid mixing deck 48 which extends horizontally between opposed sidewalls 50 of vapor channel 42 and an interior surface 52 of sidewalls 16 in catalytic distillation column 110. Liquid mixing deck 48 has at least one vertical liquids downpipe 70 to at least one reaction section 26 below. In this embodiment of the invention, at least one vent 82 from the reaction section 26 below may be included. Beneath the liquid mixing deck 48, there is a plurality of reaction product outlets 72 from reaction section 26 through which liquid reaction mixture 34 pours into a liquid transport channel 74 located below liquid mixing deck 48.

Referring to FIG. 3, a cross-section of tray 30 through X-X of FIG. 2 is illustrated. Tray 30 has at least one horizontal tray 30 situated within the vessel of catalytic distillation column 110. In one embodiment of the present invention, a sequence of spaced apart horizontal trays 30, each with reaction section 26, mixing section 27 and a distillation section 28, is situated within the catalytic distillation column 110. Each tray 30 has a catalyst 38 contained within catalyst chamber 40.

Distillation section 28 includes at least one vapor channel 42. Vapor channel 42 provides for a flow of vapor 32 passing upward through tray 30, as illustrated in FIGS. 3 and 5. Vertical sidewalls 50 extend along each side for the full length of vapor channel 42. A series of horizontal plates 44 each having holes 46 extends across the width between sidewalls 50 of vapor channel 42. Sidewalls 50 have a height selected so as to maintain a depth of liquid reaction mixture 34 in a bubbling area 68 of mixing section 27 above plate 44.

Rising vapor 32 passes through holes 46, as illustrated in FIGS. 3 and 5, so that vapor 32 bubbles through liquid reaction mixture 34 that is flowing across plate 44 in bubbling area 68, as illustrated in FIGS. 2 through 5. Liquid reaction mixture 34 flows over downcomer outlet weirs 62 and into downcomer 56 (not shown in FIGS. 3 and 5) and on to liquid mixing deck 48.

Mixing section 27 has a liquid mixing deck 48 extending horizontally between an interior surface 52 of sidewalls 16 of catalytic distillation column 110 and each of opposed sidewalls 50 of vapor channel 42. Liquid mixing deck 48 is situated at a level below the level of corresponding plate 44. Liquid mixing deck 48 has at least one liquids downpipe 70 to reaction section 26 below. In this embodiment of the invention, at least one vent 82 to the reaction section 26 below is included to balance pressure between reaction section 26 and the distillation section 28.

Liquid mixing deck 48 is situated directly above catalyst chamber 40 of corresponding reaction section 26. Catalyst chamber 40 contains catalyst 38 for a catalytic reaction. Catalyst chamber 40 is positioned within receiving pan 36 to provide for an even distribution of liquid reaction mixture 34 through the reaction section 26.

Liquid reaction mixture 34 flows through liquids downpipes 70 extending from liquid mixing deck 48 into the catalyst chamber 40. Liquid reaction mixture 34 rises through bed of catalyst 38 within catalyst chamber 40 wherein said liquid reaction mixture 34 reacts catalytically. The level of liquid reaction mixture 34 in catalyst chamber 40 rises to an open portion 80 for liquid flow above catalyst 38, until it reaches a plurality of reaction product outlets 72. Liquid reaction mixture 34 then pours into a liquid transport channel 74.

Liquid 34 travels along liquid transport channel 74 to inlet area 54 of another tray 30 below that tray 30 through which it has just passed. Contact between liquid 34 and catalyst 38 is maximized as there are no bubbles of vapor 32 rising through catalyst chamber 40.

In an alternate embodiment of the invention demonstrating a reverse-flow within the column (not illustrated), liquid reaction mixture 34 may flow down through catalyst bed 38 within catalyst chamber 40 wherein said liquid reaction mixture reacts catalytically. Liquid reaction mixture 34 is distributed above the catalyst bed 38, and passes uniformly through the catalyst bed 28. Liquid reaction mixture 34 then exits from a lower exit point close to the bottom of catalyst chamber 40.

Referring to FIG. 3, one embodiment of catalytic distillation column 110 has a vertical sheet 76 extending downward from a position above reaction product outlets 72 on sidewalls 50 into the full length of liquid transport channels 74, thus effecting a positive seal preventing movement of vapor 32 in a countercurrent direction to that of liquid 34 through reaction product outlets 72. A vent 82 is provided to allow vapor to exit from open portion 80, thus preventing build up of pressure within open portion 80 resulting from the positive seal.

Turning now to FIG. 4, a top view of a tray 30 within catalytic distillation column 210 according to the present invention is illustrated. Tray 30 has distillation section 28 near or at a portion above the midline of the tray, mixing section 27 near or at the midline of the tray and reaction section 26 not shown in FIG. 4) near or at a part below the midline of the tray.

Distillation section 28 includes at least one vapor channel 42. Vapor channel 42 extends horizontally across a width of catalytic distillation column 210. Vertical sidewalls 50 extend along each side for the full length of vapor channel 42. A series of horizontal plates 44 each having holes 46 extends across the width between sidewalls 50 of vapor channel 42. Sidewalls 50 have a height selected so as to maintain a depth of liquid reaction mixture 34 in a bubbling area 68 above plate 44.

Inlet area 54 and a downcomer 56 are at opposed ends plate 44. Inlet area 54 is adjacent a portion of sidewalls 16 of catalytic distillation column 210 providing an inlet for the distillation section 28. Downcomer 56 is adjacent to a portion of sidewalls 16 diametrically opposite to inlet area 54 providing an output from the distillation section 28. A tray outlet weir 58 extends across an end of plate 44. A downcomer outlet weir 62 extends between each end of tray outlet weir 58 and sidewalls 16 thus surrounding opening 66 of downcomer 56. A combination of tray outlet weir 58 and downcomer outlet weirs 62 also has a pre-designed height to help maintain a depth of liquid reaction mixture 34 in a bubbling area 68 of mixing section 27 above plate 44.

In the mixing section 27, tray 30 has a liquid mixing deck 48 which extends horizontally between an interior surface 52 of sidewalls 16 in catalytic distillation column 110. Liquid mixing deck 48 has at least one liquids downpipe 70 to the reaction section 26 below. There are no vents 82 in this embodiment of the invention. Beneath liquid mixing deck 48, there is a plurality of reaction product outlets 72 through which liquid reaction mixture 34 pours into a liquid transport channel 74.

Referring to FIG. 5, a side view of section Y-Y of FIG. 4 of catalytic distillation column 210 is illustrated. In this embodiment of catalytic distillation column 210, there are no vertical sheets 76 extending into liquid transport channel 74. Instead, countercurrent flow of vapor 32 against the flow of liquid reaction mixture 34 in this embodiment of catalytic distillation column 210 is resisted by flow of said liquid reaction mixture 34 through reaction product outlets 72 and the prevailing liquid pressure. This embodiment of catalytic distillation column 210 differs from catalytic distillation column 110 in that there is no positive seal at liquid transport channel 74, and there is no vent 82 from open portion 80 of the reaction section 26 of the catalytic distillation column 210 to the distillation section 28.

Referring to FIG. 5, at least one horizontal tray 30 is situated within catalytic distillation column 210. In this embodiment of the present invention, a sequence of spaced apart horizontal trays 30, each with reaction section 26, mixing section and a distillation section 28, is situated within catalytic distillation column 210.

Distillation section 28 includes at least one vapor channel 42. Vapor channel 42 provides for a flow of vapor 32 passing vertically through tray 30, as illustrated in FIG. 3. Vertical sidewalls 50 extend along each side for the full length of vapor channel 42. A series of horizontal plates 44 each having holes 46 extends across the width between sidewalls 50 of vapor channel 42. Sidewalls 50 have a height selected so as to maintain a depth of liquid reaction mixture 34 in a bubbling area 68 above plate 44.

Rising vapor 32 passes through holes 46, as illustrated in FIG. 3, so that vapor 32 bubbles through liquid reaction mixture 34 that is flowing across plate 44 in bubbling area 68, illustrated in FIGS. 2 through 5. Liquid reaction mixture 34 flows over downcomer outlet weirs and into a downcomer 56 and on to liquid mixing deck 48.

The mixing section 27 has liquid mixing deck 48 extending horizontally between an interior surface 52 of sidewalls 16 of catalytic distillation column 110 and each of opposed sidewalls of vapor channel 42. Liquid mixing deck 48 is situated at a level below the level of corresponding plate 44. Liquid mixing deck 48 has at least one vertical liquids downpipe 70 to the reaction section 26 below.

The reaction section 26 of each tray 30 has catalyst 38 contained within a catalyst chamber 40. Catalyst chamber 40 is positioned at receiving pan 36. Liquid mixing deck 48 is situated directly above catalyst chamber 40. Liquid reaction mixture 34 flows through at least one vertical liquids downpipe 70 extending from liquid mixing deck 48 into catalyst chamber 40. Liquid reaction mixture 34 rises through bed of catalyst 38 within catalyst chamber 40 wherein said liquid reaction mixture 34 reacts catalytically. The level of liquid reaction mixture 34 in catalyst chamber 40 rises to an open portion 80 for liquid reaction mixture 34 flow above catalyst 38, until it reaches a plurality of reaction product outlets 72 through which said liquid reaction mixture 34 pours into a liquid transport channel 74.

Liquid 34 travels along liquid transport channel 74 to inlet area 54 of another tray 30 below that tray 30 through which it has just passed. Contact between liquid 34 and catalyst 38 is maximized as there are no bubbles of vapor 32 rising through catalyst chamber 40.

Turning now to FIG. 6, catalytic distillation column 210 is illustrated as a section Z-Z of FIG. 4. Horizontal tray 30 is situated within catalytic distillation column 210. In this embodiment of the present invention, a sequence of spaced apart horizontal trays 30 is situated within catalytic distillation column 210. Each tray 30 has a catalyst 38 contained within catalyst chamber 40. Catalyst chamber 40 is positioned at receiving pan 36.

Liquid mixing deck 48 extends horizontally between interior surface 52 of sidewalls 16 of catalytic distillation column 210 and downcomer outlet weirs 62. Liquid reaction mixture 34 flows from inlet area 54 along a plate toward downcomer 56. Liquid reaction mixture 34 flows over downcomer outlet weirs 62 and on to liquid mixing deck 48 below. A combination of tray outlet weir 58 and downcomer outlet weirs 62 has a height designed to maintain a depth of liquid reaction mixture 34 in a bubbling area 68 above the plate.

Liquid mixing deck 48 is situated directly above catalyst chamber 40. Liquid reaction mixture 34 flows through vertical liquids downpipes 70 extending from liquid mixing deck 48 into catalyst chamber 40. Liquid reaction mixture 34 rises through bed of catalyst 38 within catalyst chamber 40 wherein the reaction mixture reacts catalytically. The level of liquid reaction mixture 34 in catalyst chamber 40 rises to an open portion 80 for said liquid reaction mixture 34 flow above catalyst 38.

Referring to FIGS. 7 and 8, another embodiment of a catalytic distillation column 310 utilizing packing according to the present invention is depicted. In FIG. 7, a top view of a horizontal tray 30 in this embodiment of the present invention is illustrated. Tray 30 has distillation sections 28, mixing sections 27 and reaction sections 26 near or at a portion of the midline of said tray 30.

Distillation section 28 includes at least one vapor channel 42. Vapor channel 42 extends horizontally across a width of catalytic distillation column 310. Packing (not shown) is positioned within vapor channel 42 to provide for vapor 32 and liquid reaction mixture 34 distillation.

Within vapor channel 42, risers 92 are positioned along a length of vapor channel 42. Risers 92 have a chimney depicted by the dotted line with a hat depicted by a solid line. Risers 92 provide a vapor chimney to allow vapor 32 to go to the packing above located within channel 42. The vapor chimney helps to balance pressure between the adjacent sections.

Horizontal tray 30 has a liquid mixing deck 48 situated between portions of interior surface 52 of sidewall 16 and downcomer outlet weirs 62. Liquids downpipes 70 provide for only liquid reaction mixture 34 movement through horizontal tray 30 and mixing deck 48 to reaction section 26.

Vapor channel 42 provides for the movement of vapor 32 through liquid mixing deck 48. Reaction product outlet 72 below liquid mixing deck 48 provides for liquid movement from the reaction section 26 below to the distillation section 28 of the next tray.

Referring to FIG. 8, a section W-W through catalytic distillation column 310 of FIG. 7 is illustrated. In this embodiment of the invention, a sequence of spaced apart horizontal trays 30, each with reaction section 26, mixing section 27 and a distillation section 28, is situated within catalytic distillation column 310. The sections of tray 30 in this embodiment lie basically in the same plane within column 310.

The distillation section 28 includes at least one vapor channel 42. Vapor channel 42 provides for a flow of vapor 32 passing vertically through tray 30 through a liquid mixing deck 48. Packing 86 is situated within the vapor channel 42 for vapor 32 and liquid reaction mixture 34 interaction and mass transfer. A liquid distributor 88 distributes liquid reaction mixture 34 across top surface 90 of packing 86. Packing 86 may be random packing or structured packing or any other type of packing that is known in the art.

After distillation of volatiles, remaining liquid reaction mixture 34 fraction exits to a horizontal liquid mixing deck 48 below. Liquid mixing deck 48 extends horizontally between an interior surface 52 of sidewalls 16 in catalytic distillation column 310. After mixing, liquid reaction mixture 34 from liquid mixing deck 48 enters through liquids downpipes 70 into catalyst chamber 40 of reaction section 28.

Catalytic distillation column 310 has at least one catalyst chamber 40 with catalyst 38. Catalyst chamber 40 is designed to more evenly distribute liquid reaction mixture 34 within the reaction section 26. In this embodiment, catalyst 38 is a packed material and is located within receiving pan 36. Liquid reaction mixture 34 enters the catalyst chamber 40 through vertical liquids downpipes 70 and is evenly distributed throughout catalyst 38 to react catalytically.

Beneath liquid mixing deck 48, a plurality of reaction product outlets 72 feed liquid reaction mixture 34 from the reaction section 26 to the distillation section 28. After the catalytic reaction, liquid reaction mixture 34 exits from open portion 80 of catalyst chamber 40 through reaction product outlet 72 to distillation section 28.

To assist in controlling a pressure drop between the sections and within the catalytic distillation column, risers 92 are positioned along a length of vapor channel 42 above liquid mixing deck 48. Risers 92 have a chimney with a hat. The risers 92 provide a vapor chimney to allow vapor 32 to rise toward packing above located within channel 42 without being plugged by the falling liquid reaction mixture 34 from tray 30 above. The vapor chimney helps to balance pressure between the sections.

Referring to FIGS. 9 and 10, an alternate embodiment of catalytic distillation column 410 has multiple catalyst chambers 40, distillation sections 28 and reaction sections 26 within tray 30. Tray 30 of this embodiment of catalytic distillation column 410 is operated in a similar manner to that for the embodiment illustrated as catalytic distillation column 310.

FIG. 9 is a top view of horizontal tray 30 of catalytic distillation column 410. Tray 30 has distillation sections 28, mixing sections 27 and reaction sections 26 near or at a portion of a midline plane of the tray. Distillation section 28 includes multiple vapor channels 42. Vapor channels 42 extend horizontally across a width of catalytic distillation column 410. Packing (not shown) is positioned within vapor channels 42 to provide for vapor 32 and liquid reaction mixture 34 distillation. Multiple packing beds 86 are situated within the vapor channels 42 so that vapor 32 bubbles through liquid reaction mixture 34 that is flowing across packing 86 for mass transfer.

Within vapor channels 42, risers 92 are positioned along a length of the vapor channels. Risers 92 have a chimney depicted by a dotted line with a hat depicted by a solid line. Risers 92 provide a vapor chimney to allow vapor 32 rise toward packing 86 above located within channel 42. The vapor chimney helps to balance pressure between the sections. Horizontal tray 30 has a liquid mixing deck 48 situated between interior surface 52 of sidewall 16 of catalytic distillation column 410 and downcomer outlet weirs 62. Liquids downpipes 70 provide for liquid reaction mixture 34 movement through horizontal tray 30 and mixing deck 48 into the reaction section 26.

Turning to FIG. 10, a vertical section through V-V of FIG. 9 is depicted. In this illustration of an embodiment catalytic distillation column 410, multiple packed beds of catalyst 38, reaction sections 26 and distillation sections 28 with packing 86 are shown. Horizontal tray 30 of catalytic distillation column 410 has reaction sections 26, mixing sections 27 and multiple distillation sections 28.

Distillation sections 28 are packed with packing 86. Liquid distributors 88 distribute liquid reaction mixture 34 across top surface 90 of packing 86. Packing 86 may be random packing or structured packing or any other type of packing known in the art.

Distillation section 28 includes multiple vapor channels 42. Vapor channels 42 extend horizontally across a width of catalytic distillation column 410. Packing 86 is positioned within vapor channels 42 to provide for vapor 32 and liquid reaction mixture 34 distillation. Multiple packing beds 86 are situated within the vapor channels 42 so that vapor 32 bubbles through liquid reaction mixture 34 that is flowing across packing 86 for mass transfer.

Within vapor channels 42, risers 92 are positioned along a length of the vapor channels 42. Risers 92 have a chimney with a hat. Risers 92 provide a vapor chimney to allow vapor 32 to rise toward packing 86 located within channel 42. The vapor chimneys help to balance pressure between the sections.

Horizontal tray 30 has liquid mixing deck 48 situated between interior surface 52 of sidewall 16 of catalytic distillation column 410 and downcomer outlet weirs 62. Liquid reaction mixture 34 mixed on liquid mixing deck 48 is fed into liquids downpipes 70 provide for liquid reaction mixture 34 movement through horizontal tray 30 and mixing deck 48 to the reaction section 26.

Reaction section 26 of catalytic distillation column 410 has multiple catalyst chambers 40 each with catalyst 38. In this embodiment, multiple beds of catalyst 38 consist of a packed material and are located within receiving pans 36. Liquid reaction mixture 34 from the vertical liquids downpipes 70 is evenly distributed within reaction section 26 at catalyst chambers 40.

After a catalytic reaction over catalyst 38, liquid reaction mixture 34 rises to open portion 80 of catalyst chamber 40. Beneath liquid mixing deck 48, a plurality of reaction product outlets 72 is situated near a top portion of open portion 80 of the catalyst chambers 40 to provide for liquid reaction mixture 34 movement to the next distillation section 28.

Figure 11:
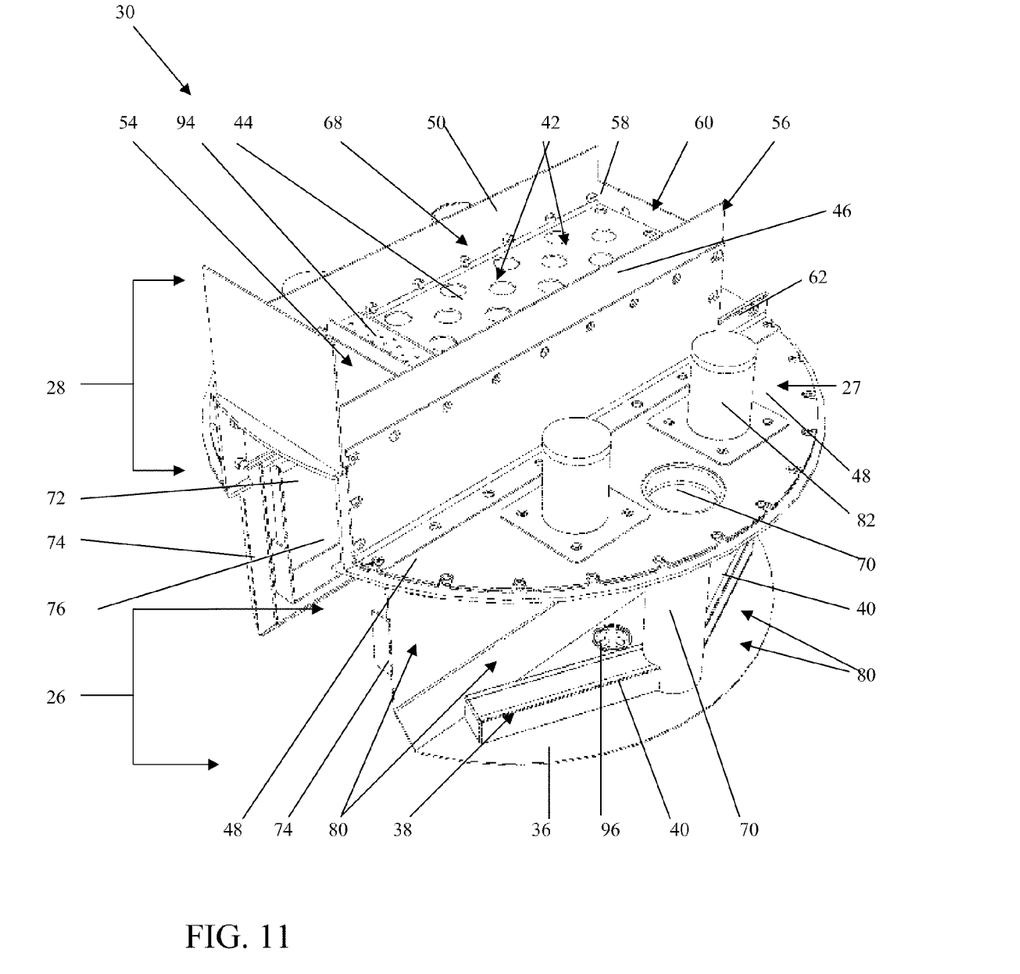
FIG. 11 is a perspective view of a tray in one embodiment of a catalytic distillation apparatus of the present invention.

Referring now to FIG. 11, a perspective view of a catalytic distillation column 410 is illustrated. In this embodiment of the present invention, horizontal tray 30, with reaction section 26, mixing section 27 and a distillation section 28, is situated within said catalytic distillation column 410. Tray 30 has a catalyst 38 contained within a catalyst chamber 40.

Distillation section 28 includes at least one vapor channel 42 positioned horizontally across tray 30. Vapor channel 42 provides for a flow of vapor 32 passing vertically through tray 30. Vertical sidewalls 50 extend along each side for the full length of vapor channel 42. A series of horizontal plates 44 each having holes 46 extends across the width between sidewalls 50 of vapor channel 42. Sidewalls 50 have a height selected so as to maintain a depth of liquid reaction mixture 34 in a bubbling area 68 above plate 44. Optionally, a froth generator or bubble promoter 94 is located at inlet area 54. Rising vapor 32 passes through holes 46, as also illustrated in FIGS. 3 and 5, so that vapor 32 bubbles through liquid reaction mixture 34 flowing from inlet area 54, across plate 44 in bubbling area 68, as also illustrated in FIGS. 2 through 5. Liquid reaction mixture 34 flows over downcomer outlet weir 58 and into downcomer 56. Liquid reaction mixture 34 then passes over downcomer outlet weir 62 and on to liquid mixing deck 48 below. A combination of tray outlet weir 58 and downcomer outlet weirs 62 also has a pre-designed height to help maintain a depth of liquid reaction mixture 34 in bubbling area 68 above plate 44.

Mixing section 27 has liquid mixing deck 48 extending horizontally between an interior surface 52 of sidewalls 16 of the catalytic distillation column and each of opposed sidewalls 50 of vapor channel 42. Liquid mixing deck 48 is situated at a level below the level of corresponding plate 44. Liquid mixing deck 48 has at least one vertical liquids downpipe 70 to reaction section 26 below. In this embodiment of the invention, at least one vent 82 from reaction section 26 below is included to balance pressure between reaction section 26 and the distillation section 28.

Liquid mixing deck 48 is situated directly above catalyst chamber 40 of the reaction section 26. Catalyst chamber 40 contains catalyst 38 for a catalytic reaction. Catalyst chamber 40 is positioned within receiving pan 36 to provide for an even distribution of liquid reaction mixture 34 through reaction section 26. During column maintenance and/or shutdown, at least one drain hole 96 provides for the draining of any remaining chemicals in catalytic distillation column 410. The catalyst chamber 40 is also designed to reduce the pressure drop and minimize the differential between sections and stages. Catalyst chamber 40 may have the same pressure as that prevailing at the tray above depending on column design and desired capacity characteristics.

Liquid reaction mixture 34 flows through vertical liquids downpipes 70 extending from liquid mixing deck 48 into catalyst chamber 40. Vertical liquids downpipe 70 and catalyst chamber 40 in combination provide for a proper distribution of liquid reaction mixture 34 throughout the bed of catalyst 38. Optionally, a liquids distributor 88 may be included for more even distribution of liquid reaction mixture 34 across the catalyst bed. This provides for a more efficient reaction and more complete reaction with between the reactant and fractionates where each is concentrated in each stage. In other typical columns, the reactant and products are on different streams leading to reactant bypass and greater plug flow reducing overall efficiency and capacity.

Liquid reaction mixture 34 rises through bed of catalyst 38 within catalyst chamber 40 wherein said liquid reaction mixture 34 reacts catalytically. The level of liquid reaction mixture 34 in catalyst chamber 40 rises to open portion 80 for liquid reaction mixture 34 flow above catalyst 38, until it reaches a plurality of reaction product outlets 72. Liquid reaction mixture 34 then pours into liquid transport channel 74.

Liquid 34 travels along liquid transport channel 74 to inlet area 54 of another tray 30 below that tray 30 through which it has just passed. Contact between liquid 34 and catalyst 38 is maximized as there are no bubbles of vapor 32 rising through catalyst chamber 40.

Vertical sheet 76 extending downward from a position above reaction product outlets 72 on sidewalls 50 into the full length of liquid transport channels 74, thus effecting a positive seal preventing movement of vapor 32 in a countercurrent direction to that of liquid reaction mixture 34 through reaction product outlets 72. At least one vent 82 is provided to allow vapor 32 to exit from open portion 80, thus preventing build up of pressure within open portion 80 resulting from the positive seal.

In an alternate embodiment, a seal is not required if there is enough head or column pressure. The seal directs the fluid and balances the pressure for an equalization between reaction section 26 and distillation section 28. However, optionally, this may or may not be included if there is a need to isolate the pressure drop differentials depending on the column design needs and requirements.

In an alternate embodiment of the invention demonstrating a reverse-flow within the column (not shown), liquid reaction mixture 34 may flow down through catalyst bed 38. In this embodiment, liquids downpipe 70 is shortened with catalyst chamber 40 being positioned directly under the liquid mixing deck 48. Liquids downpipe 70 may also be replaced with multiple perforations within the liquid mixing deck that distributes liquid reaction mixture 34 fed into catalyst chamber 40.

Liquid reaction mixture 34 is distributed across the top of catalyst bed 38, wherein said liquid reaction mixture 34 reacts catalytically and passes uniformly throughout catalyst bed 38 to a lower open portion 80. Liquid reaction mixture 34 then exits from a lower product outlet 72 close to the bottom of catalyst chamber 40 toward the next distillation section 28.

The internals of each of the embodiments of catalytic distillation column 110, 210, 310 and 410 utilize known tray design procedures such as sieve, bubble cap and valve trays, bubble promoters and single and multiple stage downcomer designs with known and calculable hydraulic conditions of columns utilizing receiving or seal pans. In the multiple embodiments of the present invention, catalyst beds 38 are located in receiving pans 36 in the present invention.

Features and resulting benefits common to each of catalytic distillation column internals include the following. A combination of catalyst chambers 40 and distillation tray components such as plates 44 or packings 86 are situated at the same catalytic distillation tray 30. Liquid flow on distillation tray 30 is in the same direction on successive trays 30 (Lewis Case 2), thus providing the best liquid reaction mixture 34 distribution across plate 44 resulting in maximized mass transfer efficiency.

Partitioned multiple catalyst chambers 40 are located in a sealed receiving pan 36 below distillation tray 30 and downcomer 56. The geometry of the reaction section 26 provides up-flow liquid phase reaction in reaction chambers 40. There are no bubbles of vapor 32 within the catalyst chamber 40, and so there is optimum contact between liquid reaction mixture 34 and catalyst 38.

High design flexibility allows for a wide range of reaction area to distillation area ratios (10:1 to 1:10), thus providing capability to match the rate of reaction with the rate of mass transfer. Changes to the tower internal design may be made by those who are skilled in the art to remain within the scope of the present invention. It also will be appreciated by those skilled in the art that the tray embodiments according to the present invention may be installed in new construction, revamp or other tower internal and column designs.

As shown in one embodiment of the present invention, the efficiency of catalytic distillation may be increased by improving the contact between the liquid phase and the catalyst by design and distribution. The catalytic distillation column has a simultaneous catalytic reaction and separation of the reaction mixture which occurs in a continuous cycle wherein there is a constant fractionation, mixing and reaction for each stage in the column.

The performance of the catalytic distillation column is also improved and enhanced by coordinating the separation step of the process with the reaction. The column internals are designed such that the distribution and application of liquid to the reaction zone and separation zones is better controlled and more uniformly applied. This leads to an increased efficiency while maintaining or lowering the total system cost for the tower internals.

While the invention has been described with respect to multiple embodiments, it will be appreciated that other alternative embodiments are possible without departing from the spirit of the invention.

The foregoing description of a preferred embodiment of the invention has been presented for purposes of illustration and description. It is not intended to be exhaustive or to limit the invention to the precise forms disclosed. Many modifications and variations will be apparent to practitioners skilled in this art. It is intended that the scope of the invention be defined by the following claims and their equivalents.

What is claimed is:

1. A catalytic distillation apparatus comprising:
   a vessel, having at least one support deck in one section of the vessel, the at least one support deck having at least one tray, each at least one tray having:
   at least one distillation section, for distillation of components of a reaction mixture, said reaction mixture comprising a vapor and a liquid reaction mixture;
   at least one mixing section, for mixing the liquid reaction mixture; and
   at least one reaction section;

so that said at least one tray simultaneously performs the functions of the at least one mixing section, the at least one reaction section and the at least one distillation section of the catalytic distillation apparatus for simultaneous catalytic reaction and distillation; wherein:

the at least one distillation section includes at least one vapor channel for rising vapor;

the at least one mixing section includes at least one mixing deck across which the liquid reaction mixture flows;

the at least one reaction section of the at least one tray includes a catalyst bed situated within a receiving pan, said receiving pan being situated below a corresponding mixing deck, each at least one reaction section of the at least one tray having a pressure equalizer to balance pressure in the at least one reaction section with pressure of the at least one distillation section, and a directional flow seal to balance pressure and distribute liquid reaction mixture from the at least one said tray such that movement of vapor in a countercurrent direction to that of the liquid reaction mixture through the at least one reaction section is prevented, so that;

the liquid reaction mixture alone flows from the at least one mixing deck through at least one vertical liquids downpipe attached to the at least one mixing deck into a corresponding receiving pan;

the liquid reaction mixture passes through the at least one catalyst bed within a catalyst chamber, then exits the corresponding receiving pan through at least one outlet of the catalyst chamber and is distributed into a vapor channel, below the height of the corresponding at least one mixing deck; so that the combination of these features provides improved distribution of the liquid reaction mixture and improved contact of said liquid reaction mixture with the catalyst during a catalytic distillation process, thus improving the performance of the catalytic distillation apparatus.

2. The catalytic distillation apparatus according to claim 1, wherein the at least one vertical liquids downpipe extends to a depth within the corresponding catalyst bed, so that the liquid reaction mixture enters the catalyst chamber at a lower part of said catalyst bed, then rises within said catalyst bed to an open section above said catalyst bed.

3. The catalytic distillation apparatus according to claim 1, wherein the at least one distillation section is a sieve tray for fractional distillation.

4. The catalytic distillation apparatus according to claim 1, wherein the at least one distillation section is a valve tray for fractional distillation.

5. The catalytic distillation apparatus according to claim 1, wherein the at least one distillation section is a bubble cap tray for fractional distillation.

6. The catalytic distillation apparatus according to claim 1, wherein the at least one distillation section contains a packing.

7. The catalytic distillation apparatus according to claim 1, wherein the corresponding receiving pan has a distributor for uniform distribution of liquid reaction mixture within the at least one reaction section.

8. The catalytic distillation apparatus according to claim 1, wherein the at least one distillation section has at least one vapor riser extending through the at least one mixing section, the vapor riser extending above the at least one mixing section so that liquid reaction mixture does not flow downward through said vapor riser.

* * * * *